March 4, 1952 F. F. CRANDELL 2,587,602
COLOR TEMPERATURE METER AND SPECTROMETER
Filed Jan. 31, 1949 2 SHEETS—SHEET 1
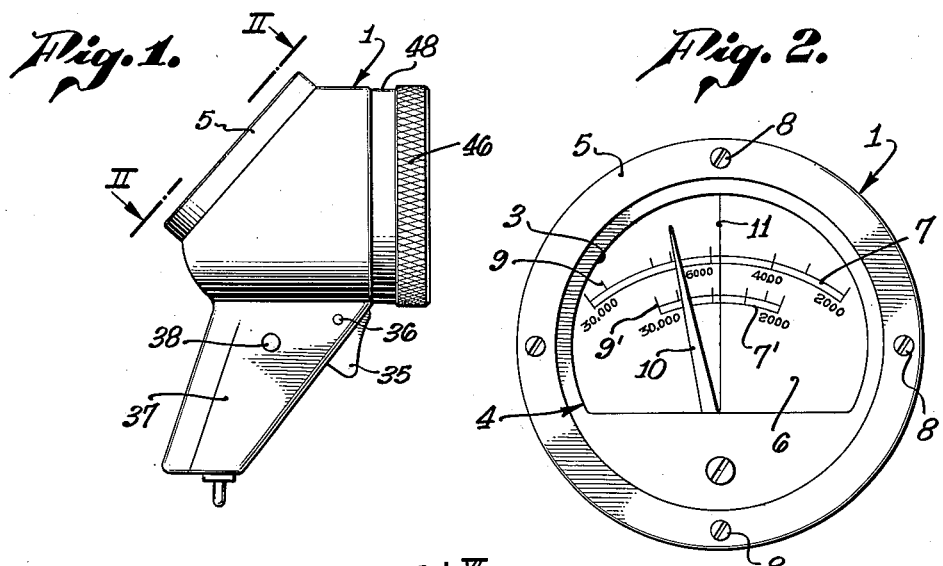
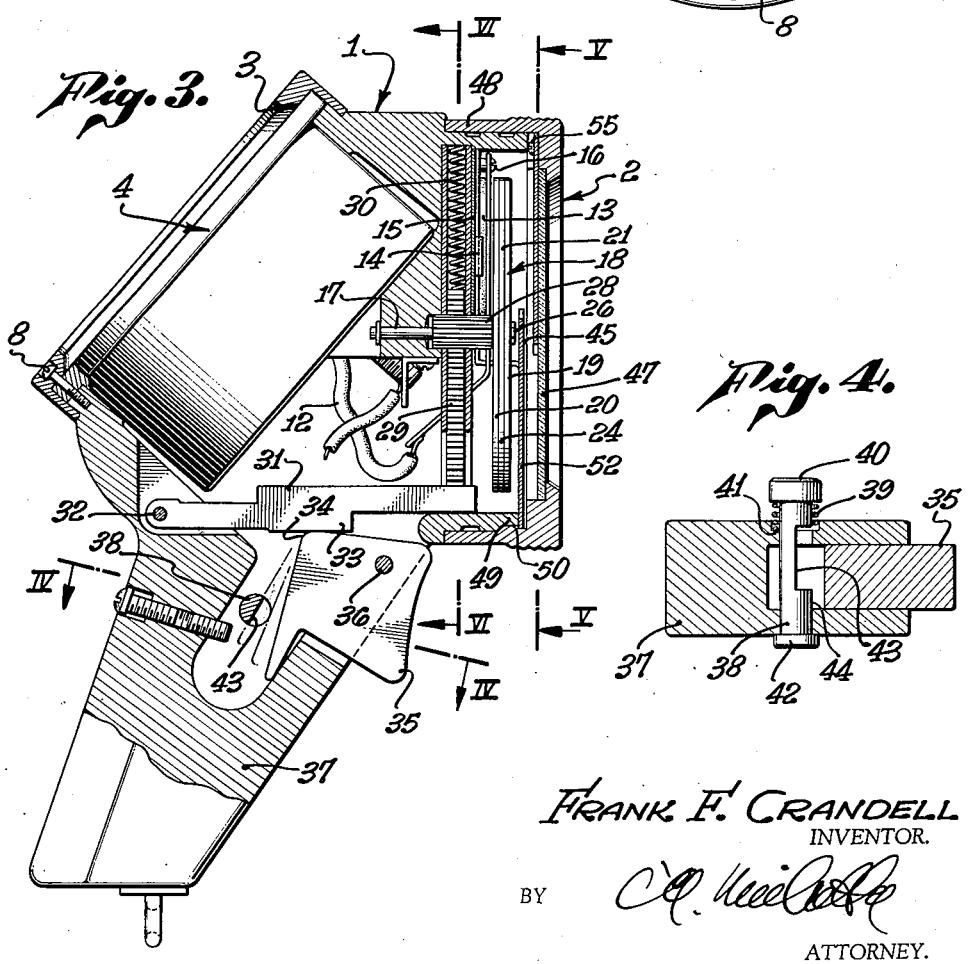
Frank F. Crandell
INVENTOR.
BY
ATTORNEY.

March 4, 1952 — F. F. CRANDELL — 2,587,602
COLOR TEMPERATURE METER AND SPECTROMETER
Filed Jan. 31, 1949 — 2 SHEETS—SHEET 2
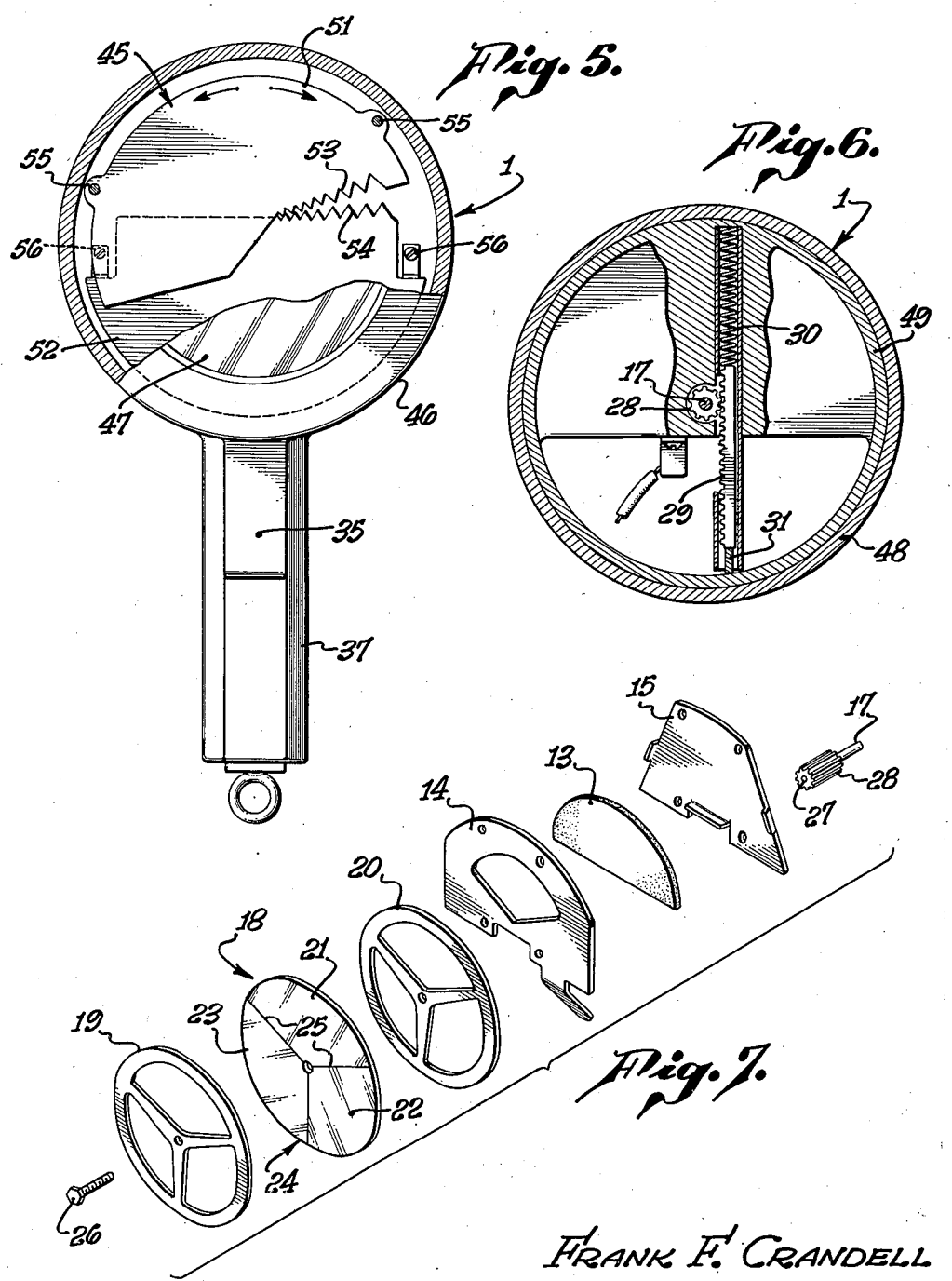

Patented Mar. 4, 1952

2,587,602

UNITED STATES PATENT OFFICE 2,587,602

COLOR TEMPERATURE METER AND SPECTROMETER

Frank F. Crandell, Pasadena, Calif., assignor to Photo Research Corporation, San Fernando, Calif., a corporation of California Application January 31, 1949, Serial No. 73,827

10 Claims. (Cl. 88—22.5)

Generally speaking, this invention pertains to apparatus for rapidly and accurately determining the color temperature and spectral characteristics of light. More particularly, it pertains to a direct reading color temperature and spectrometer arranged for direct reading of a color temperature in degrees Kelvin in a manner whereby the light, the color temperature and spectral characteristics of which is being determiner, does not interfere with or tend to obscure view of the indicating meter and cooperating scale carrying indicia calibrated in degrees Kelvin. This application is a continuation in part of the pending joint application by Frank F. Crandell and Herman Heidt, Serial No. 49,706, filed September 17, 1948, entitled "Direct Reading Color Temperature Meter," and is particularly directed to such a meter modified for measuring radiation from a gaseous vapor discharge lamp having a discontinuous or line spectrum character as compared to a continuous spectrum.

Light from different sources may be of the same intensity or brightness and still differ greatly in color or in the spectral composition of the light in terms of wave length. For example, light from the ordinary incandescent lamp, wherein the light source is an incandescent filament electrically heated, contains a relatively large proportion of relatively long wave lengths in the visible spectrum which may be described generally as being in the orange and red region of the visible spectrum. Light from the electrically heated incandescent filament source has a continuous spectrum whereas light from a vapor discharge lamp, as for example a mercury arc lamp has a discontinuous or line spectrum composed of wave length bands positioned at spaced intervals and centered at specific wave lengths depending upon the line spectrum of the metal employed.

A vapor discharge lamp such as a mercury arc lamp has a number of desirable characteristics, particularly the relatively low heat radiation, the relatively high efficiency in conversion of electrical energy into light whereby the costs of lighting would be substantially reduced, and silent operation. A mercury arc lamp emits a light however which is highly deficient in the red region of the spectrum, and the radiations of a mercury arc lamp do not tend to produce good color rendering when used to expose color film. The color quality of light from a mercury arc lamp is improved by introducing other metallic vapors in the lamp in order to correct the deficiency in the red region of the spectrum, and to fill in the gaps in the spectrum between the specific mercury wave length bands especially in the blue-green region. Such an introduced metallic vapor may be of cadmium, the introduction of which has the effect of making the spectral radiation distribution more uniform and therefore capable of rendering a better color balance.

The introduction of cadmium however creates another problem in which the quantity of green in the mercury cadmium arc lamp radiation is constantly undergoing change. It is necessary to frequently measure the quantity of green in the light source and compensate for quantities of green exceeding specified tolerances in order to obtain a true color balance on the selected exposed film. This invention contemplates a direct reading color temperature and spectrometer which is capable of readily and accurately determining whether green light is present in quantities within the specified tolerances for the particular selected color film being used or exceeds the prescribed tolerances so that compensation therefore must be made.

The apparatus of the present invention permits a photographer to rapidly and easily obtain the color temperature and spectral characteristics of light being used upon his subject so that he may either select a color film best suited for true color rendition for subjects illuminated with such light, or knowing the characteristics of his available film, the photographer may compensate for the deficiencies of the existing light by the use of compensating filters in his camera, or the photographer may compensate for the deficiencies of the existing light by varying or changing the voltage applied to the filaments of the light sources or by supplementing said light with additional light of different spectral composition, thus producing a combined light of a suitable color temperature.

Some prior art methods of determining color temperatures depend upon the matching of colors visually. Such methods are unsatisfactory because the eyes of most people differ in color perception and an individual's eyes may differ from hour to hour in color perception. Eye fatigue and physiological compensation introduces errors. Other prior art systems and methods were complex in that they involved the use of numerous meters, photocells, electrical compensating circuits, and also required the use of special computers, tables, etc. Such systems and methods were not accurate, were cumbersome, and were subject to many defects tending to introduce error or even failure in the system.

Generally speaking, the present invention includes a direct reading color temperature meter capable of not only measuring the color temperature of the light being determined, but also of readily determining the quantity of light emitted from regions between the extremities of the spectrum. The meter includes a photocell and filter means comprising three light filters arranged to modify the character of light received by the photocell in three different successive steps, and arranged for manual selective movement into operative position in front of the photocell. Diaphragm means are also provided for controlling the quantity of light passing through the selected filters and received by the photocell. Electric meter means electrically connected to the photocell is arranged for viewing at any angle to the main direction of light received by the photocell, thus simplifying reading of indicia carried by two meter scales cooperating with a movable meter index actuated by the electric meter. The two scales provided are each calibrated in degrees Kelvin, and the lower scale is related in length to the upper scale in a manner more particularly described hereinafter. A reference point is also provided in the scales in a selected common position with respect to the indicia carried by the scales.

The apparatus of the present invention permits a photographer to obtain a positive direct reading in degrees Kelvin of the color temperature of light being examined by the use of a single meter and without the necessity of employing computers and also permits him to determine spectral characteristics of light from a source producing a line spectrum.

In the preferred form of the present invention, indicia carried by the two scales is in degrees Kelvin and the common reference point is located between the end points to the indicia. In the preferred form of the invention, the filter means, including three different filters, is of disc-shape and each of the filters is of 120° sector-shape arranged contiguously so as to form the disc-shaped combined filter means. This combined filter means cooperates with manually actuatable means for selectively causing the rotation of the filter means so as to operatively, successively position each of the sector-shaped filters with respect to the photocell. In the preferred form of the invention, the means for controlling the quantity of light impinging the photocell comprises a diaphragm including two virtually semicircular sheet members arranged for rotation about a common center and lying in closely adjacent, virtually parallel planes with each of said members being provided with a lateral, serrated edge arranged to cooperate with each other to form a variable area, serratedly edged, virtually sector-shaped opening the size of which may be adjusted by manual relative rotation of one of said members with respect to the other. The preferred form of the present invention also includes a downwardly depending handle for facilitating the carrying and aiming of the color temperature meter and includes trigger means arranged to selectively position each of the filters in operative position with respect to the photocell.

It can be seen from the above general description of a preferred form of the present invention that the spectral characteristics of light may be very quickly and readily determined through the use of the present invention by aiming the meter in a direction so as to receive the light to be tested through the variable area diaphragm and through one of the filters (generally, although not necessarily, a filter selectively passing light in the blue region of the spectrum). The variable area diaphragm means may be manually adjusted until the index carried by the electric meter is at the reference point. Then the trigger may be actuated, which causes the removal of the first filter and the placing in operative position of the second filter (usually, although not necessarily, a filter selectively passing light in the red region of the spectrum) and the color temperature in degrees Kelvin may be directly read by observing the indicia on one scale underlying the movable index of the electric meter. Further actuation of the trigger means causes removal of the second filter and places in operative position the third filter (a filter selectively passing light in the selected region of the spectrum under examination) whereby the differential between the color temperature reading and the reading obtained on the other scale when the third filter is positioned indicates the quantity of light emitted from the selected region of the spectrum. The whole operation just described is exceedingly simple and rapid and has none of the disadvantages hereinbefore mentioned in connection with the prior art color temperature meters.

With the above points in mind, it is an object of the present invention to disclose and provide a simple, substantially foolproof, accurate apparatus for determining and rendering directly readable the color temperature and spectral characteristics of light.

Other and allied objects will become apparent from a careful study, examination, and perusal of the illustrations, specification and appended claims. To facilitate understanding, reference will be had to the following drawings, in which:

Fig. 1 is a side view of an illustrative embodiment of the present invention.

Fig. 2 is a view taken in the direction of arrows II—II of Fig. 1 showing the electric meter scale, indicia and reference point.

Fig. 3 is an enlarged sectional view bisecting the apparatus of the present invention shown in Fig. 1.

Fig. 4 is an enlarged fragmentary sectional view taken in the plane indicated by line IV—IV of Fig. 3.

Fig. 5 is a sectional view taken in the direction of the arrows V—V of Fig. 3.

Fig. 6 is a partial sectional view taken in the direction of the arrows VI—VI of Fig. 3.

Fig. 7 is an exploded perspective view of the photoelectric cell, filter means and pinion for actuating same, employed in the preferred form of the present invention.

Th preferred form of the present invention illustrated in the drawings comprises a hollow housing I which in the example illustrated is of cylindrical form, provided with a light-admitting port, indicated generally at 2 in one end thereof and a meter port, indicated at 3, in the other end thereof. It should be noted that the meter port 3 is inclined at an angle, preferably, although not necessarily, approximately 45° displaced from the orientation of the light-admitting port 2, making it possible for a photographer to view the meter 4 positioned therein without looking into the light being observed, which would tend to make it difficult to read the meter.

The meter 4 may be any desired type of microammeter and will not be specifically described, since such are well known in the art. In the example illustrated, a retaining ring 5 carrying a transparent window 6 is arranged in position over scales 7 and 7' carried by the meter and is threadedly fastened to the housing 1 by suitable screw means 8. The scales 7 and 7' are provided with suitable indicia indicated generally at 9 and 9' respectively arranged to cooperate with a pivotally movable index 10 which is arranged to move in response to electrical energization of the meter 4. It should be noted that the indicia 9 and 9' are in degrees Kelvin and that a common reference point, indicated at 11, is located between the end points of the indicia 9 and 9'. The purpose of the reference point 11 will be explained more fully hereinafter.

It is to be noted that, in the illustrated example indicia 9 of scale 7 cover a range of from 30,000 K. to 2000° K., with 6000° K. near the middle of the scale. The distribution along the length of the scale is such that equal angular deflections of the index member 10 along the scale produce (or respond to) equal visual changes and are correlated to equal need for correction in the film and progressive changes in correction filters. The spacing of indicia 9 is additionally determined by calibration of the meter for the reading of color temperature within the range of the visible spectrum by employing filters capable of transmitting wave length bands at opposite ends of the visible spectrum; as for example, red and blue filters.

Scale 7' is an exemplary scale to be used for examination of a light wave length band intermediate the wave length bands admitted by the red and blue filters; in this example, for determination of the amount of green light in a light source. Indicia 9' on scale 7' are arranged similarly to indicia 9 on scale 7 and cover a range from 30,000° Kelvin to 2,000° Kelvin and may be distributed along the length of scale 7' to provide equal angular deflections of the index member in response to equal visual changes. The length of scale 7' is illustrated as being approximately one-half the length of scale 7; the difference in length between scales 7 and 7', or between the spacing of indicia 9 and 9', being related to the spectral position of green in the visible spectrum and to the amount of green light emitted from a light source of continuous spectrum as compared to the relationship of the amounts of red light emanating from said light source. In the example illustrated, indicia 9 on scale 7 may be spaced in accordance with the ratio of the amount of red light to the amount of blue light in black body radiation. Likewise, indicia 9' on scale 7' are spaced in accordance with the ratio of the amount of green light to the amount of blue light in black body radiation. While the indicia have been shown in degrees Kelvin, other indicia may be used for indicating the relationship of the amounts of light admitted by the selected filters employed.

The electric meter 4 is connected by suitable leads 12 to a photocell 13 which is of semicircular form and is carried by a 120° sector apertured front bracket member 14 and a rear bracket member 15 arranged to be held in rigid engagement with the front and back sides of the photocell 13 by screw means 16. The photocell is of the photronic, barrier-layer type, such as a selenium or copper oxide photovoltaic cell. However, various other types of photocells may be utilized.

The forward end of a rotatable shaft 17 fixedly carries disc-shaped filter means indicated generally at 18 in operative position in front of the semicircular aperture in the front photocell supporting bracket 14. The filter means, indicated generally at 18 in Fig. 3, is shown more fully in exploded form in Fig. 7 and comprises an annular front supporting member provided with a centrally apertured Y-shaped cross bar, indicated generally at 19, and a similar annular rear supporting member and centrally apertured Y-shaped cross bar indicated generally at 20, arranged to be clamped on the front and rear sides of three separate different filters 21, 22 and 23 of 120° sector form arranged contiguously so as to form a disc, indicated generally at 24. The three filters 21, 22 and 23 forming the disc-shaped combined filters 24 are clamped between the front supporting member 19 and the rear supporting member 20 with the Y-shaped cross bars thereof in parallel relationship and aligned with the line of contact indicated at 25 between the three different filters 21, 22 and 23, whereby each of the filters will be accessible through corresponding sector openings in the front supporting member 19 when the combined filter means is in assembled relationship, which is attained by inserting a screw 26 through the central apertures in the front supporting member 19, the composite filter disc 24 and the rear supporting member 20 into an interiorly threaded hole 27 in the outer end of the shaft 17. It can be seen that when the combined filter means 18 is in assembled position, as shown in Fig. 3, one of the filters 21 is immediately in front of the sector-shaped aperture in the front photocell supporting bracket 14, and filters any light received by the photocell 13. Preferably, though not necessarily, the filter means 21 (in the position shown in Fig. 3) is such as to selectively pass light in the blue region of the spectrum, although this may be modified, if desired.

The shaft 17 carries a pinion 28 in engagement with a vertical rack 29. The vertical rack 29 is constrained to move in a vertical position only and is normally spring-biased downwardly by means of a spring 30 into the position shown in Fig. 3, whereby the lower end of the rack 29 abuts the end of a lever member 31 which is pivotally mounted at 32 and carries a projection 33 on its underside and adjacent the midpoint of the lever 31 which is arranged to cooperate with a cam portion 34 of a trigger 35, which is pivotally mounted at 36 in a downwardly depending handle 37. Extending through the handle 37 to the rear of and spaced from the trigger 35 is a thumb actuated spring-biased trigger lock bolt 38. The lock bolt 38 has sleeved thereon adjacent one end, a spring 39 seated against head 40 on one end of said bolt and seated within a recess 41 formed in the handle 37.

The bolt 38 is provided with an upset end 42 affording a stop means acting against the spring 39. Intermediate its ends the lock bolt 38 may be formed with a transverse slot 43 of slightly greater width than the width of the trigger and adapted to accommodate the adjacent portion of the trigger therein when the bolt 38 is pressed inwardly. In normal released position the slot is offset from the trigger so that a portion of the bolt adjacent the slot is adapted to act as a stop for the trigger upon its initial actuation.

It can be seen that normally before the trigger 35 is actuated, the filter 21, which as hereinbefore mentioned, is preferably a blue filter, is in operative position in alignment with and filters the light received by the photocell 13 so that the light received thereby will be preponderantly blue. Initial manual actuation of the trigger 35 causes the lever 31 to be pivoted in a counterclockwise direction about the pivot point 32, thus moving the rack 29 upwardly and rotating the pinion 28 in counterclockwise direction (as viewed in Fig. 6). This, of course, rotates the shaft 7 and attached filter means 18 in counterclockwise direction also. The arrangement of the lever 31, trigger 35 and rack 29 is such that initial actuation of the trigger 35 causes the rack 29 to be moved just enough to rotate the filter means 18 through 120°, thus completely removing the 120° sector filter 21 from operating position and moving the 120° sector filter 22 (which preferably, although not necessarily, is a red filter) into the operative position formerly occupied by the blue filter 21.

On initial actuation, rearward movement of the trigger is stopped by abutment at 44 against the lock bolt 38. When it is desired to operatively position filter means 23 which is illustrated as a green filter, the lock bolt 38 may be pressed inwardly and the trigger again retracted into the additional space provided by the slot 43. The second actuation of the trigger will move the rack 29 just enough to rotate the filter means 22 through 120° and operatively position filter means 23 with respect to the photocell and light limiting means.

When the trigger 35 is released, the biasing spring 30 will move the rack 29 downwardly to its former position, thus returning the pinion 28 and filter means 18 to their former positions and replacing the blue filter 21 in its former operative position in front of the photocell 13.

Variable area diaphragm means is provided and is indicated generally at 45 in Fig. 3. Generally speaking, this comprises an annular member 46 carrying a central transparent window 47 for admitting light to the apparatus and provided with a rearwardly directed circular flange 48 arranged to fit over a forwardly directed flange 49 of slightly smaller dimensions which is a part of the housing 1 and forms the light-admitting port 2. The flange 48 is arranged for rotation with respect to the flange 49 and is retained thereon by suitable retaining means indicated at 50 which also may act to frictionally maintain the relative position of the outer rotatable flange 48 with respect to the inner flange 49.

The member 46 has attached to the inner side thereof parallel to and immediately behind the glass window 40, a downwardly projecting, virtually semicircular, thin sheet, opaque disc, indicated at 51, and the inner flange 49 has provided thereon an upwardly projecting, virtually semicircular, thin sheet, opaque disc 52. It should be noted that the two oppositely directed parallel opaque discs 51 and 52 overlap slightly at the center of the port 2 and that beginning at the center of each of the semicircular members and on the same side thereof (as best seen in Fig. 5) each of said opaque members is provided with a serrated edge arranged for cooperation with each other. These serrated edges are indicated at 53 and 54.

It will readily be understood that the variable area diaphragm shutter, as shown in Fig. 4, may be opened to any desired extent by merely rotating the outer member 46 in a counterclockwise direction with respect to the inner member 49, since upper opaque disc 51 is affixed by screw means 55 to the outer member 46 and the lower opaque disc 52 is affixed by screw means 56 to the inner member 49.

It will be noted that the variable area opening formed by relative rotation of the outer member 46 in a counterclockwise direction with respect to the inner member 49 is virtually of sector form, with the sector, however, having serrated edges, and this sector distributes the light over a portion of photocell 13 without causing fatigue of the central portion of the cell (as when an iris diaphragm is used). Moreover, the distribution of light obtained by a practically closed shutter of the character described minimizes errors which may be caused by local response variations or imperfections of the cell. The serrated edges, cooperating during the closing stages, permit finer and more accurate adjustment.

The operation of the device may be described as follows. The photographer grasps the handle 37 and aims the port 2 in a manner such as to receive the light, the color temperature and spectral characteristics of which is to be determined. The blue filter 21 is in operative position and the received light passes therethrough and impinges the photocell 13, causing current to flow through the leads 12 to the microammeter 4, thus actuating the needle or index pointer 10 to some point with respect to the indicia 9. The diaphragm 45 is then adjusted by relative rotation of the outer member 46 with respect to the housing 1 until the position of the needle 10 coincides with the reference point 11, at which position the diaphragm is maintained. The effect of positioning needle 10 over reference point 11 is to base successive readings upon the amount of blue light admitted to the cell because diaphragm 45 is not readjusted while determining color temperature or while making spectral analysis of a selected wave length band. Next, the trigger 35 is actuated, thus causing the blue filter 21 to be rotated out of operative position in alignment with the opening in the diaphragm 45 and the photocell 13 and causing the red filter 22 to move into said operative position. The red light received by the photocell 13 causes the photocell to generate an electric current which repositions the microammeter needle 10 with respect to the indicia 9. The indicia 9 coinciding with the new position of the pointer 10 then indicates the color temperature of the light admitted through the port 2 in degrees Kelvin as described in co-pending application Serial No. 49,706. The determination of color temperature as above described is thus effected by measuring the relationship of the amount of red light admitted to the cell with respect to the amount of blue light admitted to the cell. The color temperature thus measured provides a reading in degrees Kelvin in black body radiation of a light source being examined.

In the event only a color temperature reading is desired, upon release of the trigger 35, the filter means 18 will rotate and reposition the blue filter in an operative position, ready for a subsequent color temperature determination.

To measure the spectral characteristics of the light being examined the operation to determine color temperature as above described is performed. After the red filter is in operative position and the color temperature or position of pointer 10 noted on upper scale 9, the trigger lock bolt 38 is pressed inwardly permitting further retraction of the trigger into the slot 43 and moving the selected green filter means 23 into operative position. Placing the green filter means 23 before the cell after determination of color temperature in degrees Kelvin and without disturbing or readjusting diaphragm 45 provides a comparison of the amount of green light actually transmitted by the wave length bands of a light source being examined to the amount of green light contained in a light source having a color temperature as determined above. The position of the pointer 10 then indicates the color Kelvin reading on scale 7' will indicate whether the amount of green light admitted from the light source being examined is the same or different than the amount of green light emanating from the light source having the color temperature determined above. If the pointer 10 does not change position with respect to the indicia 9', corresponding to the reading in degrees Kelvin found above which gives the color temperature, upon placing the green filter 23 in operative position, the amount of green in the light being examined is satisfactory for producing true color balance in the selected color film. In the event the pointer 10 moves from the degrees Kelvin reading the amount of deviation as read on the second scale indicates the excess or deficiency of green light being emitted from the light source. If the variation of amount of green light is greater than the tolerances allowed for the seletced color film being used, compensation must be made to obtain true color balance on the selected exposed film. Thus where vapor discharge lamps are used in photography, the amount of green light emanating from said lamp at any selected time may be quickly and, for photography purposes, accurately determined.

The angular position of the meter 4, scale 7, indicia 9 and pointer 10 with respect to the median direction of reception of light, the color temperature and spectral characteristics of which is to be determined, makes it possible for the photographer to read the scale without undesirable interference caused by the light. This occurs by reason of the fact that the photographer does not have to look directly toward the source of the light but reads the two scales at an angle to the main source of light, thus minimizing the blinding that generally occurs in prior art exposure meters and the like.

The advantages and uses of the present invention in determining color temperature only will be apparent from consideration of the following examples.

If, for instance, the meter has shown that the color temperature of the light is 3200° K. the photographer knows that the proper film to use is a film sensitized to give color balance for light of 3200° K. Such a film is commercially available and can be used for photographing the scene or subject without the use of compensating filters.

If, however, such film is not available and the photographer desires to use Kodachrome (which is balanced for light of 5900° K.) then during actual photographing he must use a compensating filter which will raise the color temperature of the light from 3200° to 5900° K. The required filter would transmit a sufficient amount of blue or short wave lengths and absorb a proportion of red or long wave lengths so as to produce total transmitted light of 5900° K.

In the event the color temperature of the light being used in photography was determined to be 12,000° K. (in accordance with the method of my invention) and the picture was to be taken with an emulsion of film balanced for 5900° K. then an orange compensating filter would be used during photography, such filter being capable of absorbing the cold or blue wave lengths and transmitting sufficient warm or long wave lengths to transmit a total transmitted light of 5900° K.

When the device is used in photographic work (and not in pyrometry for industrial purposes) the ready selection of a compensating filter is facilitated by placing other scales and indicia in visual relationship to the needle 10. Two or three scales of this type, each corresponding to a specific film, may be used, thereby permitting the owner of the instrument to not only determine color temperature, but also immediately know what compensating filter to use with the film and the filter factor of such filter.

The advantages of using this device when the source of light is a vapor discharge lamp where measurement of the spectral composition of the light source in specific wavelength bands is required will be readily apparent to those skilled in the art. In this case determination of the color temperature of the light source may be noted if desired. Since the spectral composition of the light emanating from a vapor discharge lamp has a discontinuous line spectrum characterized by the particular metal employed in the lamp, and since the light emanating from the lamp is not constant in the quantity of light produced from specific wavelength bands in the line spectrum, it becomes necessary to determine at intervals of time whether the light emitted from a specific region of the spectrum is in the proper quantity to obtain true color balance on the particular selected film being exposed. The apparatus of the present invention provides a rapid, accurate means for accomplishing this result.

Having therefore determined the color temperature and spectral characteristics of the light and having selected the compensating filter to be used during photography, it is now only necessary to determine the exposure to be given the film. The exposure to be given may be best determined by the use of any standard suitable photoelectric or other exposure meter in the normal manner. The exposure so determined is of course modified or multiplied by the filter factor of the compensating filter used in the camera.

It is thus apparent that although the scales are calibrated in terms of degrees Kelvin, if it is desired to use the meter solely for determination of spectral characteristics of light emitted from a vapor discharge lamp such as a mercury arc lamp or fluorescent lamp the scales may include indicia of the percentage of light emitted and the differential read upon movement of the pointer when the third filter is brought into operative position will show whether the quantity of light is within specified tolerances or suitable for the particular color film being used.

In a slightly modified form of device, an auxiliary manually movable ring may be carried by the housing adjacent the flange 48 of manually adjustable ring member 46. The housing may carry a reference point or arrow pointing to one edge of the auxiliary ring; such edge may carry indicia identifying various film speeds so that the operator may rotate the ring into position correlated to the speed of the film used by him. The opposite edge of such auxiliary ring may be a sliding contact with the edge of flange 48; such opposite edge may carry indicia indicating "f" numbers or stops while the edge area of flange 48 may carry cooperatively related indicia indicating shutter speeds. Since member 46 (and flange 48) are manually adjusted to a fixed reference point position during determination of color temperature; this arrangement permits the operator to simultaneously determine his exposure factors in terms of lens opening and shutter speed.

Although the scale illustrated in the drawings shows graduations from 2000° K. to 30,000° K., the device may actually be made to respond only to a limited range; for example, in the modified form just described, the meter may be biased so as to be active only in a range of say 2700° K. to 3750° K. and cover such range with a 90° deflection of the index, permitting accurate readings to be taken within the range used during photography. One of such scales can be used for indicating stops and correction filters for use with film balanced for 3200° K. and another to give the same information for film balanced for 3400° K. Moreover, the device may be used to identify and check the color of signal flares etc., in terms of their visual effect and color impression by the use of three color filters of such characteristics that they are equivalent to the three color sensitivities of the human eye, the meter being then calibrated in terms of ratios of red and green to blue sensitivity.

Numerous modifications and variations of this invention not specifically described herein will be apparent to those skilled in the art and are intended to be comprehended and included herein. For example, the filter means may be modified considerably without departing from the spirit of the present invention, which is merely to provide three distinct filters of different spectral absorption characteristics selectively movable into the path of light impinging the photocell.

The means for producing this movement may be modified within wide limits. Various types of diaphragms or light-admission controlling means other than that specifically described and illustrated herein may be employed; light polarizing elements capable of movement into crossed position may be used.

The invention distinctly contemplates the use of a translucent, thin, semi-spherical light-gathering and integrating means placed over the light-admitting part of the device. The serrated edge illustrated in the diaphragm-type, light-admission means may be modified or dispensed with, if desired. The angular inclination of the electric meter and scale may be substantially modified. While this invention has been described as employing a red and blue filter, it is not limited to such.

The examples described and illustrated herein are exemplary only and are not intended to limit the scope of the present invention, which is to be interpreted in the light of the appended claims only.

I claim:

1. In a light responsive device for determining the color temperature and spectral characteristics of light being examined, the combination of: a hollow housing provided with a light admitting port, a light responsive cell to receive light admitted through the port, an adjustable light limiting means positioned between the cell and the port for controlling the quantity of light impinging the cell; a light filter means movably positioned between the cell and the port; said filter means including a first light filter adapted to transmit virtually a selected band of light wave lengths, a second light filter adapted to transmit virtually a second selected band of light wave lengths different from the first mentioned band of wave lengths; a third light filter adapted to transmit virtually a third selected band of light wave lengths; said third selected wavelength band being intermediate the first and second selected wavelength bands, manually actuable means for selectively causing each of said light filters to be operatively positioned between the cell and the port, an electrically responsive meter operatively connected to the cell and to an index movable by said meter, and two scales provided with indicia in degrees Kelvin and having a common reference point in operative relation to the movable index, one scale having indicia spaced to indicate color temperature as measured by response of said index to light transmitted by the second filter and light transmitted by the first filter, and the other scale having indicia spaced to determine the amount of light in the selected intermediate wave length band being examined by response of the index to the light transmitted by the third filter and the light transmitted by the second filter whereby a differential between indicia read on each scale indicates a variance in the amount of light in the wave length band being examined from an amount of light in a light source having color temperature as read on said one scale; said meter and scale being carried by the housing at an angle to the light admitting port whereby an observer may observe the scales in a direction at an angle to the mean direction of light received through the light admitting port, the spectral composition of which is to be measured.

2. Apparatus of the character stated in claim 1, wherein the three different light filters comprising the filter means are each of sector shape and arranged in juxtaposition so as to form a circular, disc-shaped filter means rotatably mounting said filters to operatively position either filter between the light-responsive cell and the light-admitting port.

3. In a light responsive device for determining the color temperature and spectral characteristics of light being examined, the combination of: a hollow housing provided with a light admitting port, a light responsive cell to receive light admitted through the port, an adjustable light limiting means positioned between the cell and the port for controlling the quantity of light impinging the cell; a light filter means movably positioned between the cell and the port; said filter means including a first light filter adapted to transmit virtually a selected band of light wave lengths, a second light filter adapted to transmit virtually a second selected band of light wave lengths different from the first mentioned band of wave lengths; a third light filter adapted to transmit virtually a third selected band of light wave lengths; said third selected wavelength band being intermediate the first and second selected wavelengths bands, manually actuable means for selectively causing each of said light filters to be operatively positioned between the cell and the port, an electrically responsive meter operatively connected to the cell and to an index movable by said meter, and two scales provided with indicia in degrees Kelvin and having a common reference point in operative relation to the movable index, one scale having indicia in degrees Kelvin and cooperable with response of the index to the amount of light transmitted by the first and second filters to determine color temperature, and the other scale having indicia in degrees Kelvin cooperable with response of the index to the light transmitted by the third filter to determine spectral characteristics of said light transmitted by said third filter, a difference in reading in degrees Kelvin on each scale indicating a variance in the amount of light transmitted by the third filter from the amount of said light in a light source having a color temperature as determined on the said one scale; said meter and scale being carried by the housing at an angle to the light admitting port whereby an observer may observe the scales in a direction at an angle to the mean direction of light received through the light admitting port, the spectral composition of which is to be measured; said filter means comprising three different light filters each of 120° sector shape and arranged in juxtaposition so as to form a circular disc-shaped filter means rotatably mounting said filters to operatively position each filter between the cell and the port; and said means for selectively positioning said filters in operative position comprising a pinion fixedly attached to the center of the disc-shaped filter means including the three different sector-shaped filters and in engagement with a manually actuatable rack, actuation of which is arranged to rotate the pinion and attached filter means 120° so as to effectively remove one filter from its normal operative position and move another filter into operative position with respect to the light-responsive cell and the light-admitting port.

4. In a light responsive device for determining the color temperature and characteristics of light being examined, the combination of: a hollow housing provided with a light admitting port, a light responsive cell to receive light admitted through the port, an adjustable light limiting means positioned between the cell and the port for controlling the quantity of light impinging the cell; a light filter means movably positioned between the cell and the port; said filter means including a first light filter adapted to transmit virtually a selected band of light wave lengths, a second light filter adapted to transmit virtually a second selected band of light wave lengths different from the first mentioned band of wave lengths; a third light filter adapted to transmit virtually a third selected band of light wave lengths; said third selected wavelength band being intermediate the first and second selected wavelength bands, manually actuable means for selectively causing each of said light filters to be operatively positioned between the cell and the port, an electrically responsive meter operatively connected to the cell and to an index movable by said meter, and two scales provided with indicia in and having a common reference point in operative relation to the movable index, one scale having indicia cooperable with response of the index to the amount of light transmitted by the first and second filters to determine color temperature, and the other scale having indicia cooperable with response of the index to the light transmitted by the third filter for comparing the amount of light transmitted by the third filter to the amount of said light in a light source having a color temperature as determined on said one scale; said meter and scale being carried by the housing at an angle to the light admitting port whereby an observer may observe the scales in a direction at an angle to the mean direction of light received through the light admitting port, the spectral composition of which is to be measured; said filter means comprising three different light filters each of 120° sector shape and arranged in juxtaposition so as to form a circular disc-shaped filter means rotatably mounting said filters to operatively position each filter between the cell and the port; said means for selectively positioning said filters in operative position comprising a pinion fixedly attached to the center of the disc-shaped filter means including the three different sector-shaped filters and in engagement with a manually actuatable rack, actuation of which is arranged to rotate the pinion and attached filter means 120° so as to effectively remove one filter from its normal operative position and move another filter into operative position with respect to the light-responsive cell and the light-admitting port; said positioning means including spring means arranged to bias the rack in one direction, lever means in engagement with the rack and arranged upon actuation thereof to move the rack against the action of the spring means, and manually actuatable trigger means arranged to pivotally actuate the lever means.

5. In a light responsive device for determining the color temperature and characteristics of light being examined, the combination of: a hollow housing provided with a light admitting port, a light responsive cell to receive light admitted through the port, an adjustable light limiting means positioned between the cell and the port for controlling the quantity of light impinging the cell; a light filter means movably positioned between the cell and the port; said filter means including a first light filter adapted to transmit virtually a selected band of light wave lengths, a second light filter adapted to transmit virtually a second selected band of light wave lengths different from the first mentioned band of wave lengths; a third light filter adapted to transmit virtually a third selected band of light wave lengths; said third selected wavelength band being intermediate the first and second selected wavelength bands, manually actuable means for selectively causing each of said light filters to be operatively positioned between the cell and the port, an electrically responsive meter operatively connected to the cell and to an index movable by said meter, and two scales provided with indicia in degrees Kelvin and having a common reference point in operative relation to the movable index, one scale having indicia to indicate color temperature by correlation of the amount of light transmitted by the second filter to the amount of light transmitted by the first filter as measured by response of said index thereto, and the other scale having indicia spaced to determine spectral characteristics of a selected intermediate light wave length band by correlation of the amount of light transmitted by said third filter to the amount of light transmitted by the second filter whereby comparison of indicia read on each scale indicates spectral characteristics of the amount of light transmitted by said third filter in the wave length being examined to the amount of said light in a light source having a color temperature as red on the said one scale, said meter and scale being carried by the housing at an angle to the light admitting port whereby an observer may observe the scales in a direction at an angle to the mean direction of light received through the light admitting port, the spectral composition of which is to be measured; said filter means comprising three different light filters each of 120° sector shape and arranged in juxtaposition so as to form a circular disc-shaped filter means rotatably mounting said filters to operative position each filter between the cell and the port; said means for selectively positioning said filters in operative position comprising a pinion fixedly attached to the center of the disc-shaped filter means including the three different sector-shaped filters and in engagement with a manually actuatable rack, actuation of which is arranged to rotate the pinion and attached filter means 120° so as to effectively remove one filter from its normal operative position and move another filter into position with respect to the light-responsive cell and the light-admitting port; said positioning means including spring means arranged to bias the rack in one direction, lever means in engagement with the rack and arranged upon actuation thereof to move the rack against the action of the spring means, and manually actuatable trigger means arranged to pivotally actuate the lever means; and means cooperable with said trigger means for selectively limiting retraction thereof for operatively positioning the second and third light filters.

6. In a portable, direct reading meter for determining spectral characteristics of a light source for photography including a single light-admitting port, a single light-responsive cell to receive light admitted through said port, and light-limiting means for said port, the combination of: a single light filter means including at least three light filters selectively movable between the port and the cell, two of said filters being capable of transmitting selected spaced wave length bands in the visible spectrum and the third filter being capable of transmitting an intermediate wave length band in the spectral region to be examined; a meter operatively connected to the cell and to an index movable by the meter; and at least two scales provided with indicia and having a common reference point for the index, one scale having indicia spaced to indicate color temperature by correlation of the amount of light transmitted by the second filter to the amount of light transmitted by the first filter as measured by response of said index thereto, and the other scale having indicia spaced to determine spectral characteristics of a selected intermediate light wave length band by correlation of the amount of light transmitted by said third filter to the amount of light transmitted by the second filter whereby a differential between the indicia read on each scale indicates a variance in the amount of light in the wave length band being examined from an amount of said light in a light source having color temperature as read on said one scale.

7. In a portable, direct reading meter for determining spectral characteristics of a light source for photography including a single light-admitting port, a single light-responsive cell to receive light admitted through said port, and light-limiting means for said port, the combination of: a light filter means including at least three light filters selectively movable between the port and the cell, two of said filters being capable of transmitting spaced selected wave length bands in the spectrum and the third filter being capable of transmitting a wave length band in the spectral region to be examined intermediate said selected wave length bands; a meter operatively connected to the cell and to an index movable by the meter; and at least two scales provided with indicia and having a common reference point for the index, one scale having indicia in degrees Kelvin and cooperable with response of the needle to the amount of light transmitted by the first and second filters to determine color temperature and the other scale having indicia in degrees Kelvin cooperable with response of the index to the light transmitted by the third filter to determine spectral characteristics of said light transmitted by said third filter, a difference in reading in degrees Kelvin on each scale indicating a variance in the amount of light transmitted by the third filter from the amount of said light in a light source having a color temperature as determined on said one scale.

8. A meter of the character stated in claim 7 including a spring biasing said light filter means; and means for moving said light filter means to successively position each light filter between the port and the cell and comprising a trigger to overcome said biasing spring and a member transverse to the trigger for limiting movement of the trigger to position one of the filters, said transverse member being axially movable for providing further movement of the trigger to position another filter.

9. In a light responsive device for use in determining spectral characteristics of light having a discontinuance line spectrum, the combination of: a hollow housing provided with a light-admitting port; adjustable light-limiting means carried by the housing in operative relation to said port; a light responsive cell within said housing to receive light admitted through said port; an electrically responsive meter operatively connected to the cell; an index movable by said meter; at least two scales having a common reference point in operative relation to the movable index; light filter means including at least three light filters adapted to be positioned between the light limiting means and the cell; means for selectively positioning said light filters to change the character of light delivered to the cell through said light-limiting means; said filters being adapted to transmit selected spaced wave length bands, one filter being capable of transmitting a wave length band to be examined; one of said scales having indicia to indicate color temperature by response of said index to two of said filters and another of said scales having indicia to indicate, by response of said index to said one filter and to one of said two filters, a comparison of the amount of light transmitted by said one filter from the wave length band under examination to the amount of light present in a light source having color temperature as determined by response of said index to said two filters as indicated by said first mentioned scale.

10. In a light responsive device for use in determining spectral characteristics of a light source including light having a discontinuance line spectrum, the combination of: a hollow housing provided with a light admitting port; adjustable light-limiting means carried by the housing in operative relation to said port; a light responsive cell within said housing to receive light admitted through said port; an electrically responsive meter operatively connected to the cell; and index movable by said meter; at least two scales having a common reference point in operative relation to the movable index, each scale having indicia spaced for indicating virtually equal visual color changes for virtually equal deflection of said index; light filter means including at least three light filters adapted to be positioned between the light limiting means and the cell; means for selectively positioning said light filters to change the character of light delivered to the cell through said light-limiting means; said filters being adapted to transmit selected spaced wave length bands, one filter being capable of transmitting a wave length band to be examined; the spacing of indicia on one scale being correlated to the spectral positions of the wave length bands transmitted by two of said filters; the spacing of indicia on another scale being correlated to the spectral position of the wave length band to be examined and to a wave length band being transmitted by one of said other filters, said one scale being cooperable with the response of the index to light transmitted by said two filters to determine color temperature; said another scale being cooperable with response of the index to light transmitted by said one filter and to one of said two filters for determining the amount of light transmitted thereby as compared to the amount of light emanating from a light source having a color temperature as determined by the first two filters.

FRANK F. CRANDELL.

REFERENCES CITED

The following references are of record in the file of this patent:

UNITED STATES PATENTS

| Number | Name | Date |
| --- | --- | --- |
| 1,233,631 | Wikstrom | July 17, 1917 |
| 1,775,143 | Twyman et al. | Sept. 9, 1930 |
| 1,898,219 | Sharp | Feb. 21, 1933 |
| 2,203,036 | Briessen et al. | June 4, 1940 |
| 2,296,103 | Haberkost | Sept. 15, 1942 |
| 2,389,617 | Freund | Nov. 27, 1945 |
| 2,436,104 | Fisher et al. | Feb. 17, 1948 |
| 2,442,506 | Morris | June 1, 1948 |
| 2,455,116 | Gittus | Nov. 30, 1948 |
| 2,462,823 | Woodward | Feb. 22, 1949 |

FOREIGN PATENTS

| Number | Country | Date |
| --- | --- | --- |
| 412,096 | Great Britain | June 21, 1934 |
| 446,016 | Great Britain | Apr. 22, 1936 |

OTHER REFERENCES

J. O. S. A., Article by Hunter, vol. 30, November 1940, pages 542, 543, 544 and 545. Copy in division 7.

Gately article in American Cinematographer, Aug. 1, 1948, pages 267, 278 and 281. Photostat copy in 88—22.5 A.